(12) United States Patent
Brenner

(10) Patent No.: US 12,345,190 B2
(45) Date of Patent: Jul. 1, 2025

(54) SUPPORT UNIT FOR SUPPORTING A HEATING CONDUCTOR OF AN EXHAUST GAS HEATER ON A CARRIER STRUCTURE

(71) Applicant: Purem GmbH, Neunkirchen (DE)

(72) Inventor: Holger Brenner, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 18/526,867

(22) Filed: Dec. 1, 2023

(65) Prior Publication Data

US 2024/0183298 A1    Jun. 6, 2024

(30) Foreign Application Priority Data

Dec. 2, 2022   (DE) ............... 10 2022 131 967.9

(51) Int. Cl.
| | |
|---|---|
| *F01N 3/20* | (2006.01) |
| *B01D 53/94* | (2006.01) |
| *F01N 3/027* | (2006.01) |
| *F01N 3/28* | (2006.01) |

(52) U.S. Cl.
CPC ............ *F01N 3/2026* (2013.01); *B01D 53/94* (2013.01); *B01D 2258/01* (2013.01); *B01D 2259/40088* (2013.01); *B01D 2259/40096* (2013.01); *F01N 3/0275* (2013.01); *F01N 3/204* (2013.01); *F01N 3/2839* (2013.01); *F01N 2240/04* (2013.01); *F01N 2510/02* (2013.01); *F01N 2550/22* (2013.01); *F01N 2610/107* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,140,812 | A | * | 8/1992 | Cornelison ........... F01N 3/2026 422/174 |
| 5,140,813 | A | * | 8/1992 | Whittenberger ......... B01J 35/33 60/299 |
| 5,413,767 | A | | 5/1995 | Breuer et al. |
| 6,031,213 | A | * | 2/2000 | Hashimoto ........... F01N 3/2026 422/174 |
| 2014/0190151 | A1 | * | 7/2014 | Culbertson .............. H05B 3/44 60/303 |
| 2014/0290229 | A1 | | 10/2014 | Hirth et al. |

(Continued)

FOREIGN PATENT DOCUMENTS

| | | |
|---|---|---|
| DE | 93 17 050 U1 | 3/1995 |
| DE | 10 2018 213 358 A1 | 2/2020 |

(Continued)

*Primary Examiner* — Binh Q Tran
(74) *Attorney, Agent, or Firm* — Walter Ottesen, P.A.

(57) ABSTRACT

A support unit for supporting a heating conductor of an exhaust gas heater on a carrier structure includes a supporting sleeve extending in the direction of a longitudinal axis and surrounding the longitudinal axis, a supporting pin having a sleeve connecting area extending in the supporting sleeve and an exhaust gas heater connecting area projecting beyond the supporting sleeve, wherein the supporting pin, at least in the area of its sleeve connecting area, and/or the supporting sleeve, on an inner surface surrounding the sleeve connecting area of the supporting pin, is coated with insulating material, and wherein the sleeve connecting area is held in the supporting sleeve by a force fit.

14 Claims, 3 Drawing Sheets

(56) References Cited

U.S. PATENT DOCUMENTS

| | | |
|---|---|---|
| 2017/0226909 A1 | 8/2017 | Hirth et al. |
| 2021/0301767 A1* | 9/2021 | Feng ..................... F02M 26/13 |
| 2022/0074333 A1 | 3/2022 | Hoeckel et al. |
| 2022/0174787 A1* | 6/2022 | Mallon ..................... H05B 3/16 |
| 2023/0061713 A1* | 3/2023 | Hammer .................. H05B 3/16 |

FOREIGN PATENT DOCUMENTS

| | | |
|---|---|---|
| DE | 10 2020 123 376 A1 | 3/2022 |
| DE | 10 2020 125 698 A1 | 4/2022 |
| EP | 3 212 907 B1 | 7/2018 |
| WO | 2022/243381 A1 | 11/2022 |

\* cited by examiner

SUPPORT UNIT FOR SUPPORTING A HEATING CONDUCTOR OF AN EXHAUST GAS HEATER ON A CARRIER STRUCTURE

This application claims priority of German patent application no. 10 2022 131 967.9, filed Dec. 2, 2022, the entire content of which is incorporated herein by reference.

TECHNICAL FIELD

The present disclosure relates to a support unit for supporting a heating conductor of an exhaust gas heater on a carrier structure, an exhaust gas heater constructed with at least one such support unit, and a method for producing such a support unit. The disclosure further relates to an exhaust gas system constructed with such an exhaust gas heater.

BACKGROUND

US 2020/0074333 discloses an exhaust gas heater for an exhaust gas system of an internal combustion engine, in which a heating conductor having a substantially disk-shaped and fundamentally meandering structure is carried on a carrier structure at a plurality of fastening points. The carrier structure includes a respective carrier part upstream and downstream of the heating conductor. The two carrier parts receive the heating conductor between them and enclose the latter radially on the outside. Insulating elements constructed with ceramic material are positioned at the fastening points between each carrier part and the heating conductor. Firm cohesion is achieved by bolts passing through the carrier parts, the insulating elements and the heating conductor.

It is an object of the present disclosure to provide a support unit for supporting a heating conductor of an exhaust gas heater on a carrier structure, with which, in a structurally simple configuration, a stable electrically insulated support of a heating conductor on a carrier structure is achieved.

According to the disclosure, this object is, for example, achieved by a support unit for supporting a heating conductor of an exhaust gas heater on a carrier structure, including a supporting sleeve extending in the direction of a longitudinal axis and surrounding the longitudinal axis, a supporting pin having a sleeve connecting area extending into the supporting sleeve, and an exhaust gas heater connecting area projecting beyond the supporting sleeve, wherein the supporting pin, at least in the area of its sleeve connecting area, and/or the supporting sleeve, on an inner surface surrounding the sleeve connecting area of the supporting pin, is coated with insulating material and wherein the sleeve connecting area is held in the supporting sleeve by a force fit.

Since, in a support unit constructed according to the disclosure, the cohesion of the two components producing a connection between a heating conductor and a carrier structure, that is, the supporting sleeve and the supporting pin, are held together firmly solely by a force fit and thus without the use of additional components and are electrically insulated from one another by the insulating material, a simple structure resistant to mechanical, thermal and chemical loadings is achieved.

For a configuration which can be produced simply and also cost-effectively, the supporting pin can be configured with a substantially cylindrical external circumferential contour, at least in its sleeve connecting area, so that, in particular, the supporting sleeve can also be provided as a substantially cylindrical and thus simply producible component.

In an alternative configuration, the supporting pin, at least its sleeve connecting area, can be configured to taper, preferably conically, preferably in the direction away from the exhaust gas heater connecting area, which makes the axial insertion of these two components into each other simpler.

In particular with this tapering structure of the supporting pin, the force fit can be provided in a simple way by axially pressing the sleeve connecting area into the supporting sleeve.

Alternatively or additionally to such axial pressing, a stable force fit between the supporting sleeve and the supporting pin can be provided by thermal treatment of the supporting sleeve and/or the supporting pin before insertion of the sleeve connecting area into the supporting sleeve.

For this purpose, provision can be made, for example, for the supporting sleeve to be heated and/or the supporting pin to be cooled before insertion of the sleeve connecting area into the supporting sleeve.

In order, on the one hand, to achieve adequately high electrical insulation, including against comparatively high electrical currents, via the insulating material, and, on the other hand, not to impair the structural strength provided by the force fit, the insulating material can have a layer thickness in the range from 0.01 mm to 0.1 mm. With such a thin coating with the insulating material, at the same time a very low thermal mass of the overall support unit is also achieved.

If the insulating material is formed with ceramic material, very good electrical insulation with likewise very good thermal and chemical resistance of the insulating material is achieved.

In order to shield the insulating material as efficiently as possible against external action, in particular by an exhaust gas flowing through an exhaust gas system, it is proposed that the insulating material does not project axially beyond the supporting sleeve at least at one axial end of the supporting sleeve.

To avoid leakage currents, the insulating material can project axially beyond the supporting sleeve, at least at an axial end of the supporting sleeve that faces the exhaust gas heater connecting area.

If the supporting pin and the supporting sleeve are formed with metallic material, a thermally, mechanically and chemically resistant structure is supported and, at the same time, the possibility is provided of attaching the supporting pin and the supporting sleeve to the heating conductor or carrier structure in a material-bonding manner, for example by welding.

The disclosure further relates to a method for producing a support unit according to the disclosure, wherein, for the force-fitting connection of the supporting sleeve to the supporting pin, the supporting sleeve is heated and/or the supporting pin is cooled before the insertion of the sleeve connecting area into the supporting sleeve. The present disclosure therefore uses the effect that, by heating the supporting sleeve, the latter initially expands and during the following cooling, engages firmly around the supporting pin already inserted therein and is pressed with its inner surface firmly against an outer surface of the supporting pin to produce a stable frictional connection. Accordingly, it is possible to achieve the situation where the supporting pin is cooled before the insertion into the supporting sleeve, so that the latter contracts and, during the expansion occurring again during subsequent heating, is pressed with its outer surface against the inner surface of the supporting sleeve to produce a firm frictional connection.

It is particularly advantageous if the supporting sleeve is heated to a temperature above an upper limiting temperature that occurs at most on an exhaust gas heater and/or the supporting pin is cooled to a temperature below a lower limiting temperature that occurs at most on an exhaust gas heater. The upper limiting temperature is a temperature which is generally not reached or exceeded in an exhaust gas heater integrated into an exhaust gas system, in particular during operation of the latter. Likewise, the lower limiting temperature is a temperature which is generally not undershot in an exhaust gas heater integrated into an exhaust gas system, for example with very low ambient temperatures. It is thus possible to ensure that, following integration of such an exhaust gas heater into an exhaust gas system, no such cooling or heating of a support unit which could lead to the force-fitting or frictional connection brought about by thermal conditioning being cancelled again occurs as a result of external influences.

The disclosure further relates to an exhaust gas heater for an exhaust gas system of an internal combustion engine, including a carrier structure and at least one heating conductor carried on the carrier structure via at least one support unit constructed according to the disclosure.

For a stable structure, the at least one support unit can be fastened to the carrier structure, preferably by its supporting sleeve, by material bonding, preferably by welding, and preferably fastened to the at least one heating conductor by its supporting pin, by material bonding, preferably by welding.

The disclosure further relates to an exhaust gas system having at least one exhaust gas heater constructed according to the disclosure.

BRIEF DESCRIPTION OF DRAWINGS

The invention will now be described with reference to the drawings wherein.

DETAILED DESCRIPTION

Figure 1:
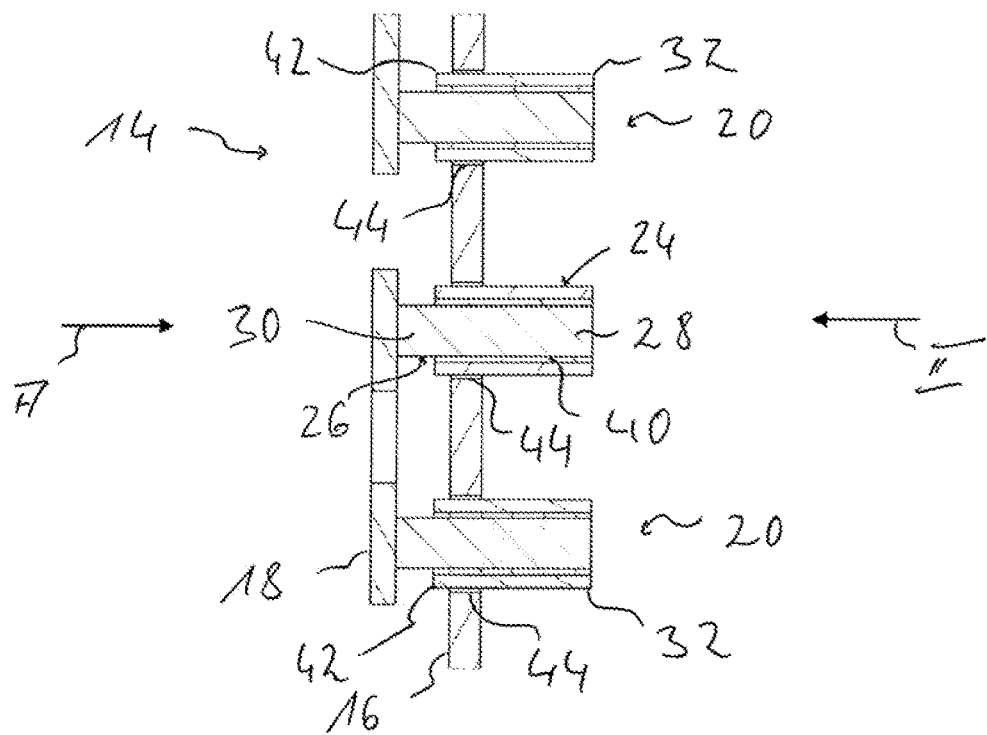
FIG. 1 shows a section of an exhaust gas heater for an exhaust gas system of an internal combustion engine.

Before the structure of a support unit for supporting a heating conductor on a carrier structure of an exhaust gas heater is described in detail below with reference to FIGS. 1 to 4, firstly the basic structure of an exhaust gas system 10 including such an exhaust gas heater will be explained with reference to FIG. 5.

The exhaust gas system 10 includes an exhaust gas guide element 12, for example of tubular form, in which exhaust gas A flows in an exhaust gas main flow direction. An exhaust gas heater 14 arranged in the exhaust gas guide component 12 includes a plate-like carrier structure 16, for example formed as a sheet-metal shape part or sheet-metal punched part, which is attached in its outer circumferential region to an inner surface of the exhaust gas guide component 12, for example by material bonding, for example by welding. On the carrier structure 16, a heating conductor 18 for example having a meandering or spirally wound structure formed by being cut out of a flat material is carried firmly by a plurality of support units 20. By applying an electrical voltage to connecting ends of the heating conductor 18, the latter is heated by the electrical current flowing through the latter to a temperature of, for example, several 100° C. The heat generated in the heating conductor 18 can be transferred to the exhaust gas A flowing through the latter and also the carrier structure 16 in the region of passage openings 21 formed therein. The exhaust gas A heated in the region of the exhaust gas heater 14 flows further in the direction of an exhaust gas treatment unit, designated generally by 22. This can be formed, for example, as a catalytic converter, such as, for example, an oxidation catalytic converter, SCR catalytic converter, or the like, or as a particle filter.

As a result of the heating of the exhaust gas A having a comparatively low temperature, for example at comparatively low external temperatures or at the start of the working operation of an internal combustion engine, the possibility is created of bringing the exhaust gas treatment unit 22 positioned downstream of the exhaust gas heater 14 more quickly to the operating temperature required for this or keeping the latter reliably at such an operating temperature. In particular, there is also the possibility of heating another gas led through the exhaust gas component 12, for example air, before the internal combustion engine on the exhaust gas heater 14 is started, and then using the heat transferred to this gas for the thermal conditioning of the exhaust gas treatment unit 22 even before the internal combustion engine is started.

Figure 2:
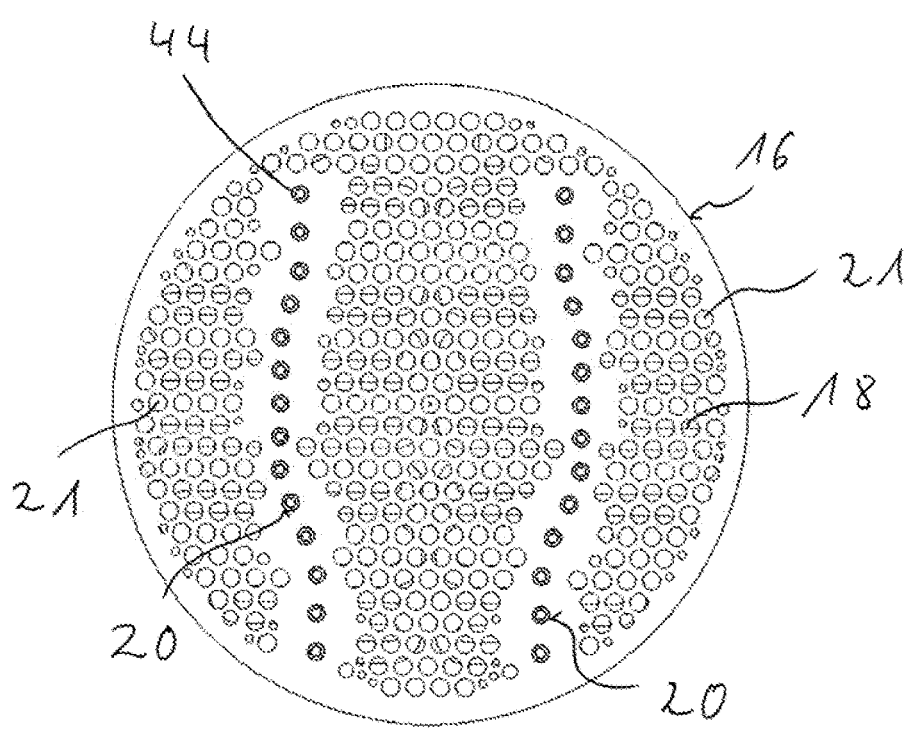
FIG. 2 shows the exhaust gas heater from FIG. 1 in the viewing direction II in FIG. 1.
Figure 3:
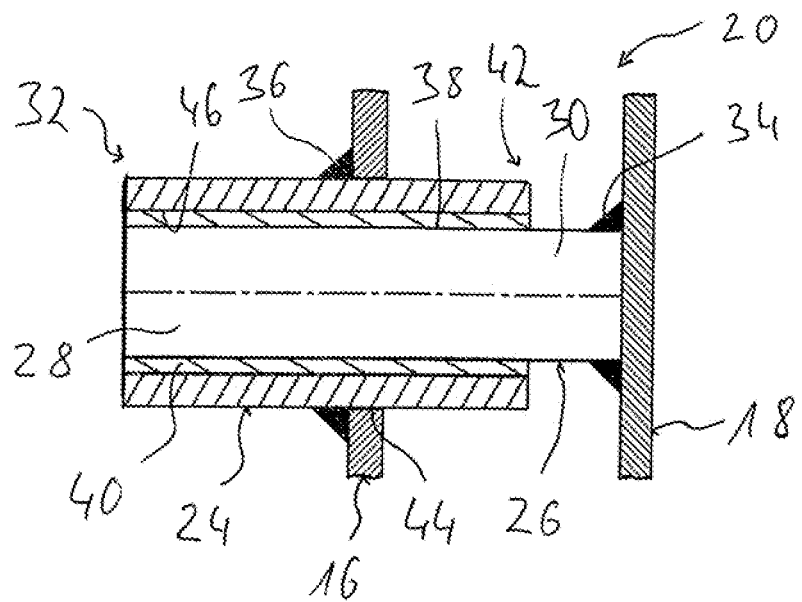
FIG. 3 shows a longitudinal section of a support unit connecting a heating conductor to a carrier structure of an exhaust gas heater.

In FIGS. 1 to 3, one configuration of such a support unit 20 used in the exhaust gas heater 14 is illustrated in detail. The support unit 20 includes a supporting sleeve 24 extending longitudinally in the direction of a longitudinal axis L. The supporting sleeve 24 in the configuration illustrated has a cylindrical, for example circular, cross-sectional geometry, in particular an internal cross-sectional geometry, and is preferably made with metallic material.

In the supporting sleeve 24, a supporting pin 26 is received with a sleeve connecting area 28 thereof. In the configuration illustrated, the support pin 26 is fastened to the heating conductor 18 via an exhaust gas heater connecting area 30 projecting beyond the supporting sleeve 24.

The supporting sleeve 24 is fastened to the carrier structure 16 in an area between a section lying between an axial end 32 facing away from the exhaust gas heater connecting area 30 and an axial end 42 facing the exhaust gas heater connecting area 30, in which section the supporting pin 26 passes through an associated opening 44 in the plate-like carrier structure 16 illustrated in FIG. 2. Both the fastening of the supporting pin 26 to the heating conductor 18 and also the fastening of the supporting sleeve 24 to the carrier structure 16 can be carried out by a respective welding 34, 36. For this purpose, various welding methods, such as, for example, laser welding, MAG welding, WIG welding or the like can be used. In this way, a connection of the support unit 20 both to the heating conductor 18 and also to the carrier structure 16 that is resistant to mechanical and thermal loadings and also chemically resistant to the exhaust gas flowing through the exhaust gas heater 14 is ensured.

For the electrical insulation of the heating conductor 18 with respect to the carrier structure 16, likewise formed with metallic material, a coating with insulating material 40 is provided, for example on an outer surface 38 of the supporting pin 26 in the sleeve connecting area 28 of the same. The insulating material 40 can preferably be formed with ceramic material and, for example, applied in the form of a paint coating or by vapor deposition with a layer thickness in the range from 0.01 mm to 0.1 mm.

Both at the axial end 32 of the supporting sleeve 24 that faces away from the exhaust gas heater connecting area 30 and at the axial end of the supporting sleeve 24 that faces the exhaust gas heater connecting area 42, the insulating material 40 does not project beyond the latter but preferably ends flush with the latter. At these two axial ends 32, 42 of the supporting sleeve 24, the insulating material 40 is therefore exposed to the outside only with a very small, ring-like end face and can thus come into contact with the exhaust gas flowing around the support unit 20 only in this area. This protects the insulating material 40 additionally with respect to external influences, in particular the chemically aggressive exhaust gas A.

Alternatively or additionally to coating the supporting pin 26 with the insulating material 40, such insulating material could also be applied to an inner surface 46 of the supporting sleeve 24, for example in the form of a paint coating or by vapor deposition or the like.

In order to achieve a stable connection between the supporting sleeve 24 and the supporting pin 26 without having to use additional means leading to a material bond or a form fit to do so, in the support unit 20 the supporting pin 26 is held in the supporting sleeve 24 solely by a force fit, that is, a frictional connection. In the configuration illustrated in FIG. 1, in which the supporting sleeve has a substantially cylindrical inner surface 46 and the supporting pin 26 has a substantially cylindrical outer surface 38, this force fit can be achieved by thermal treatment of the supporting sleeve 24 and/or the supporting pin 26 before the insertion of these two components into each other. For example, the supporting sleeve 24 can be heated, so that this expands, and the supporting pin 26 can initially be inserted into the supporting sleeve 24 substantially without any substantial frictional contact with the coating already provided on the sleeve connecting area 28. During the subsequent cooling, the supporting sleeve 24 contracts and presses firmly with its inner surface 46 and over the entire area substantially uniformly against the outer surface 38 of supporting pin 26 and the insulating material 40 provided thereon. Thus, local overloading, in particular of the insulating material 40, is reliably avoided. In order to ensure that, even during operation of an exhaust gas system 10 or of the exhaust gas heater 14 and the heating also of the support unit 20 which occurs in the process, this force-fitting connection is not cancelled, during this thermal treatment the supporting sleeve 24 is preferably heated to a temperature which lies above the temperature which the exhaust gas heater 14 or the heating conductor 18 of the same can reach at most during operation of the exhaust gas system 10.

During a thermal treatment that is to be performed additionally or alternatively, before the insertion of the supporting pin 26 into the supporting sleeve 24, the supporting pin 26 can be cooled, preferably to a temperature which lies below a temperature to which the exhaust gas heater 14 and the support unit 20 provided thereon are subjected at most. To be considered here as below the limiting temperatures are thus in particular very low ambient temperatures, which can lie in the range from −30° C. to −40° C. Following such cooling of the supporting pin 26, this can then be introduced into the supporting sleeve 24 to the desired extent with the coating with insulating material 40 already provided thereon and, subsequently, heated to ambient temperature again, so that, through the expansion of the supporting pin 26 which then occurs, the latter is pressed firmly and uniformly against the inner surface 46 of the supporting sleeve 24 with the coating of insulating material 40 provided on its outer surface 38.

In order, with this thermal treatment during the connection of the supporting sleeve 24 to the supporting pin 26, to ensure that stable cohesion of the supporting sleeve 24 with the supporting pin 26 is maintained following production of the connection, even while taking account of the thermal load of such a support unit 20 occurring in a vehicle, the supporting sleeve 24 with its internal dimension and the supporting pin 26 with its external dimension are coordinated with each other in such a way that only after this thermal treatment, that is, after heating of the supporting sleeve 24 and/or cooling of the supporting pin 26, can the supporting pin 26 be inserted into the supporting sleeve 24 with the smallest possible radial movement play.

Since also during the connection of the support unit 20 to the heating conductor 18 or the carrier structure 16, for example by welding, the support unit 20 is not heated to such an extent that substantial impairment of the force fit occurs as a result of the thermally induced shape change, in particular of the supporting sleeve 24, that occurs in the process, there is also no danger that during the production of the welds 34, 36, a relative movement between the supporting pin 26 and the supporting sleeve 24 that leads to an undefined connecting state can occur. In addition, the fact that different materials, in particular metallic materials, with mutually different thermal expansion coefficients can be used for the supporting sleeve 24 and the supporting pin 26, does not impair the structural strength of the support unit 20 in such a connection brought about by thermal treatment.

Figure 4:
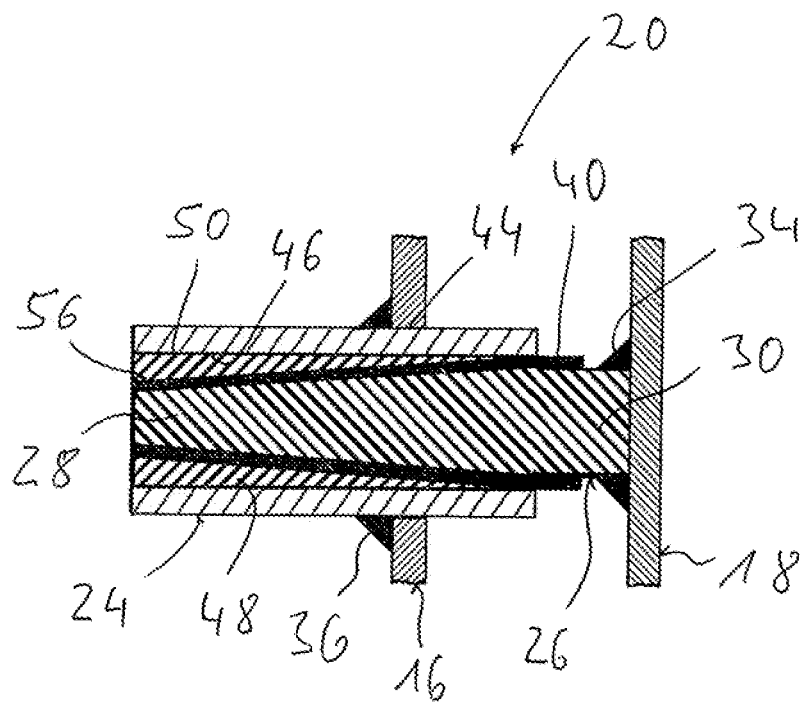
FIG. 4 shows a view corresponding to FIG. 1 of an alternative type of configuration of a support unit; and, FIG. 5 shows an illustration of the principle of an exhaust gas system having an exhaust gas heater.
Figure 5:
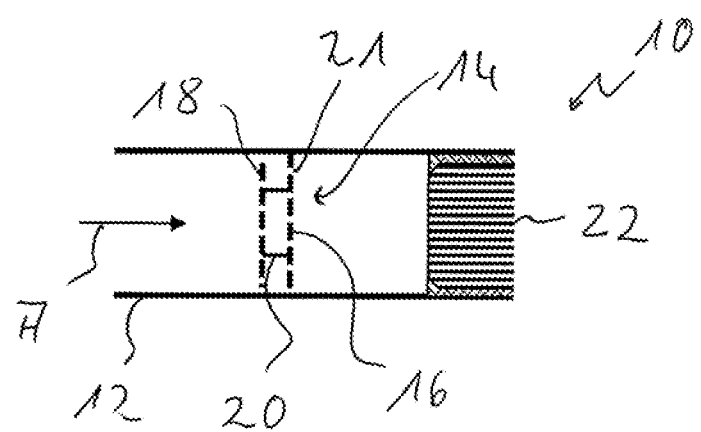

An alternative type of configuration of such a support unit 20 is illustrated in FIG. 4. In this type of configuration, the supporting pin 26, in particular in its sleeve connecting area 28, is formed with a cross-sectional geometry preferably tapering conically in the direction away from the exhaust gas heater connecting area 30. Accordingly, the supporting sleeve 24 is formed with a cross-sectional area that decreases in the direction from the axial end 42 to the axial end 32. This can be provided for example in that a sleeve-like insert part 48 which has a cylindrical structure matched to the internal cross-sectional geometry of the supporting sleeve 24 on its outer circumferential surface 50 and has on its inner side an inner surface 56 correspondingly tapering in the axial direction matched to the, for example, conical cross-sectional geometry or conically tapering structure of the supporting pin 26 is inserted into the supporting sleeve 24 basically formed with a cylindrical cross-sectional geometry. For example, this insert part 48 can also be formed with metallic material. In an alternative type of configuration, the internal cross-sectional geometry tapering conically in the axial direction can be provided directly on the inner surface 46 of the supporting sleeve 24. In a further alternative type of configuration, the conically tapering structure could also be provided in such a way that a cross-sectional decrease of the supporting pin 26 in the direction of the exhaust gas heater connecting area 30 not surrounded by the supporting sleeve 24 is provided.

Also in the configuration illustrated in FIG. 2, the insulating material 40 can be applied to the outer surface 38 of the supporting pin 26, for example by applying a paint coating or by vapor deposition or the like. It can be seen in FIG. 2 that the insulating material 40 projects axially at the axial end 42 of the supporting sleeve 24 and extends into the area of the exhaust gas heater connecting area 30 not surrounded by the supporting sleeve 24, for example formed with a substantially cylindrical outer circumferential structure. Thus, reliable protection against leakage currents between the exhaust gas heater connecting area 30 and the axial end 42 of the supporting sleeve 24 can also be achieved. In order also to avoid the occurrence of leakage currents between the supporting pin 26 and the carrier structure 16 at the axial end 32 of the supporting sleeve 24, at which, in the configuration illustrated, the supporting pin 26 ends with its sleeve connecting area 28 substantially flush with the supporting sleeve 24, the supporting pin 26 can also project axially beyond the supporting sleeve 24 in the area of the axial end 32, and can be coated with the insulating material 40 in its section projecting beyond the supporting sleeve 24. It should be pointed out that such a structure can of course also be implemented in the configuration illustrated in FIG. 1.

For the firm connection of the supporting pin 26, formed so as to taper at least in its sleeve connecting area 28, to the supporting sleeve 24, the supporting pin 26 can be pressed axially into the supporting sleeve 24 during the axial insertion into the latter, so that a frictional connection or force fit leading to self-locking is also produced. Uniform surface pressure on the coating with insulating material 40 surrounding the supporting pin 26, in particular in its sleeve connecting area 28, is also produced here. Alternatively or additionally, in this type of configuration of a support unit 20, the force fit can be achieved by the thermal treatment of the supporting sleeve 24 and/or the support pin 26 described above with reference to the configuration of FIG. 1.

With the structure of a support unit according to the disclosure, with a structurally simple configuration with a low number of components, an attachment of a heating conductor of an exhaust gas heater to a carrier structure that is mechanically stable and resistant to thermal and chemical influences is achieved. At the same time, reliable electrical insulation between the heating conductor and the carrier structure is ensured, wherein the material and/or the layer thickness of the coating with insulating material can be selected in a manner matched to the respective overall sizes and the electrical currents against which electrical insulation is required. At the same time, this coating of electrically insulating material contributes to thermal insulation of the heating conductor, in particular when the latter is formed of a comparatively poor thermal conductor, such as, for example, ceramic material, so that the heat generated therein is substantially transmitted not to the carrier structure but primarily to the gas or exhaust gas flowing around the heating conductor. Since the insulating material applied in the form of a coating is substantially shielded completely from the chemically aggressive exhaust gas by the supporting sleeve surrounding the supporting pin, there is not the danger that the insulating material is damaged by such chemical influences, possibly supported by thermal loading, over the operating lifetime of an exhaust gas heater, and the danger of a short circuit between the supporting sleeve and supporting pin received in the latter does not occur. The fact that in addition, by the force fit generated between the supporting sleeve and the supporting pin, the insulating material is subjected to a substantially constant contact pressure distributed uniformly over the area of the same, also contributes to this. The penetration of corrosive media into the interspace between the supporting pin and the supporting sleeve, in which the insulating material is substantially arranged, is thus likewise reliably avoided.

It is understood that the foregoing description is that of the preferred embodiments of the invention and that various changes and modifications may be made thereto without departing from the spirit and scope of the invention as defined in the appended claims.

The invention claimed is:

1. A support unit for supporting a heating conductor of an exhaust gas heater on a carrier structure, the support unit comprising:
   a supporting sleeve extending in a direction of a longitudinal axis and surrounding the longitudinal axis;
   a supporting pin having a sleeve connecting area extending in said supporting sleeve and an exhaust gas heater connecting area projecting beyond said supporting sleeve;
   at least one of said supporting pin, at least in an area of said sleeve connecting area and said supporting sleeve, on an inner surface surrounding said sleeve connecting area of said supporting pin, being coated with an insulating material; and,
   said sleeve connecting area being held in the supporting sleeve by a force fit, wherein said force fit is provided by thermal treatment of at least one of said supporting sleeve and said supporting pin before insertion of said sleeve connecting area into said supporting sleeve, wherein at least one of said supporting sleeve is heated and said supporting pin is cooled before insertion of said sleeve connecting area into said supporting sleeve.

2. The support unit of claim 1, wherein said supporting pin is formed with a cylindrical outer circumferential contour, at least in said sleeve connecting area.

3. The support unit of claim 1, wherein said supporting pin, at least in said sleeve connecting area, is configured to taper.

4. The support unit of claim 1, wherein said supporting pin, at least in said sleeve connecting area, is configured to taper at least one of conically and in a direction away from said exhaust gas heater connecting area.

5. The support unit of claim 1, wherein said insulating material has a layer thickness in a range from 0.01 millimeters to 0.1 millimeters.

6. The support unit of claim 1, wherein said insulating material is formed with ceramic material.

7. The support unit of claim 1, wherein said insulating material does not project axially beyond the supporting sleeve at least at one axial end of said supporting sleeve.

8. The support unit of claim 1, wherein said insulating material projects axially beyond said supporting sleeve, at least at an axial end of said supporting sleeve facing said exhaust gas heater connecting area.

9. The support unit of claim 1, wherein said supporting pin and said supporting sleeve are made with a metallic material.

10. A method for making a support unit for supporting a heating conductor of an exhaust gas heater on a carrier structure, the support unit including a supporting sleeve and a supporting pin; the supporting sleeve extending in a direction of a longitudinal axis and surrounding the longitudinal axis; said supporting pin having a sleeve connecting area extending in the supporting sleeve and an exhaust gas heater connecting area projecting beyond the supporting sleeve; at least one of the supporting pin, at least in an area of the sleeve connecting area and the supporting sleeve, on an inner surface surrounding the sleeve connecting area of the supporting pin, being coated with an insulating material; and, the sleeve connecting area being held in the supporting sleeve by a force fit, the method comprising:

at least one of heating said supporting sleeve and cooling said supporting pin before the insertion of the sleeve connecting area into the supporting sleeve for the force-fit connection of the supporting sleeve to the supporting pin.

11. The method of claim 10, wherein at least one of the supporting sleeve is heated to a temperature above an upper limiting temperature that maximally occurs on an exhaust gas heater and the supporting pin is cooled to a temperature below a lower limiting temperature that maximally occurs on an exhaust gas heater.

12. An exhaust gas heater for an exhaust gas system of an internal combustion engine, the exhaust gas heater comprising:
- a carrier structure;
- at least one support unit;
- at least one heating conductor carried on said carrier structure via said at least one support unit;
- said at least one support unit including a supporting sleeve and a supporting pin;
- said supporting sleeve being fastened to said carrier structure by material bonding and extending in a direction of a longitudinal axis and surrounding the longitudinal axis;
- said supporting pin having a sleeve connecting area extending in said supporting sleeve and an exhaust gas heater connecting area projecting beyond said supporting sleeve and being fastened to said at least one heating conductor by material bonding;
- at least one of said supporting pin, at least in an area of said sleeve connecting area and said supporting sleeve, on an inner surface surrounding said sleeve connecting area of said supporting pin, being coated with an insulating material; and,
- said sleeve connecting area being held in the supporting sleeve by a force fit.

13. The exhaust gas heater of claim 12, wherein said supporting sleeve is fastened to said carrier structure by welding and said supporting pin is fastened to said at least one heating conductor by welding.

14. An exhaust gas system for an internal combustion engine, the exhaust gas system comprising:
- an exhaust gas heater having a carrier structure, at least one support unit, and at least one heating conductor carried on said carrier structure via said at least one support unit;
- said at least one support unit including a supporting sleeve and a supporting pin;
- said supporting sleeve being fastened to said carrier structure by material bonding and extending in a direction of a longitudinal axis and surrounding the longitudinal axis;
- said supporting pin having a sleeve connecting area extending in said supporting sleeve and an exhaust gas heater connecting area projecting beyond said supporting sleeve and being fastened to said at least one heating conductor by material bonding;
- at least one of said supporting pin, at least in an area of said sleeve connecting area and said supporting sleeve, on an inner surface surrounding said sleeve connecting area of said supporting pin, being coated with an insulating material; and,
- said sleeve connecting area being held in the supporting sleeve by a force fit.

* * * * *